(12) United States Patent
Huang et al.

(10) Patent No.: US 9,247,375 B2
(45) Date of Patent: Jan. 26, 2016

(54) DISASTER RESCUE MODE FOR BODY AREA NETWORKS

(71) Applicant: Olympus Corporation, Tokyo (JP)

(72) Inventors: Rongsheng Huang, Poway, CA (US); Lichung Chu, San Diego, CA (US)

(73) Assignee: Olympus Corporation, Tokyo (JP)

( * ) Notice: Subject to any disclaimer, the term of this patent is extended or adjusted under 35 U.S.C. 154(b) by 343 days.

(21) Appl. No.: 13/870,862

(22) Filed: Apr. 25, 2013

(65) Prior Publication Data

US 2014/0320311 A1    Oct. 30, 2014

(51) Int. Cl.
| | |
|---|---|
| *G08B 19/00* | (2006.01) |
| *H04W 4/00* | (2009.01) |
| *H04W 4/22* | (2009.01) |
| *G08B 21/02* | (2006.01) |
| *G08B 25/00* | (2006.01) |
| *G08B 25/01* | (2006.01) |
| *H04W 4/02* | (2009.01) |
| *H04W 4/06* | (2009.01) |

(52) U.S. Cl.
CPC .............. *H04W 4/006* (2013.01); *G08B 25/002* (2013.01); *G08B 25/007* (2013.01); *H04W 4/22* (2013.01); *G08B 21/0277* (2013.01); *G08B 25/009* (2013.01); *G08B 25/016* (2013.01); *H04W 4/008* (2013.01); *H04W 4/027* (2013.01); *H04W 4/06* (2013.01); *Y02B 60/50* (2013.01)

(58) Field of Classification Search
CPC .............................. H04W 4/22; H04W 76/007
See application file for complete search history.

(56) References Cited

U.S. PATENT DOCUMENTS

| | | | | |
|---|---|---|---|---|
| 8,565,716 | B2 * | 10/2013 | Bragg | 455/404.2 |
| 2006/0009191 | A1 * | 1/2006 | Malone, III | 455/404.1 |
| 2007/0230379 | A1 * | 10/2007 | Moisio et al. | 370/310 |
| 2009/0073924 | A1 * | 3/2009 | Chou | 370/328 |
| 2009/0231125 | A1 * | 9/2009 | Baldus et al. | 340/539.12 |
| 2012/0115431 | A1 * | 5/2012 | Kim et al. | 455/404.1 |
| 2013/0057391 | A1 * | 3/2013 | Salvador et al. | 340/10.1 |
| 2014/0005738 | A1 * | 1/2014 | Jorgenson et al. | 607/7 |

* cited by examiner

*Primary Examiner* — Steven Lim
*Assistant Examiner* — Omeed Alizada
(74) *Attorney, Agent, or Firm* — Sheppard Mullin Richter & Hampton LLP

(57) ABSTRACT

Body area networks (BANs) implemented in accordance with this disclosure may enter a disaster rescue mode. The disaster rescue mode is triggered in disaster scenarios to help body devices to assist in rescue.

54 Claims, 13 Drawing Sheets

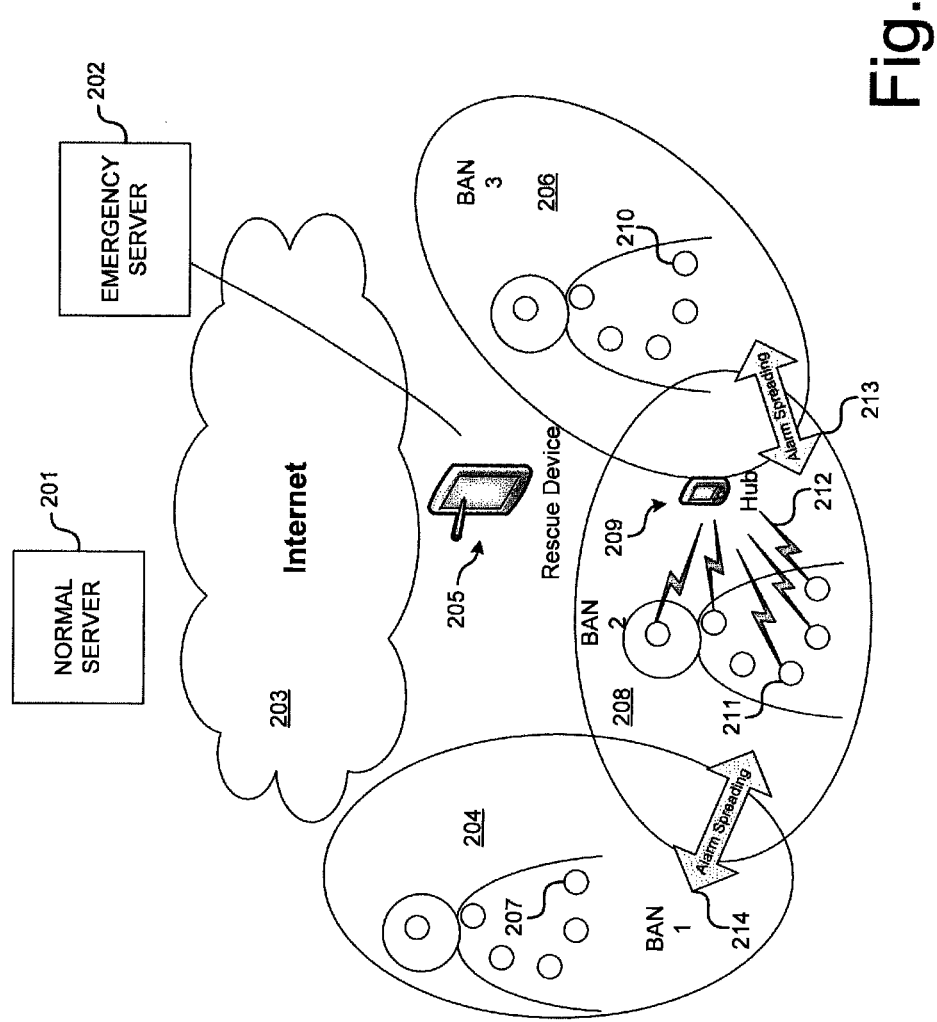

DISASTER RESCUE MODE FOR BODY AREA NETWORKS

TECHNICAL FIELD

The disclosed technology relates generally to wireless networks, and more particularly, some implementations relate to systems and methods for disaster rescue or emergency response using wireless networks.

DESCRIPTION OF THE RELATED ART

Taking advantage of wireless networks in disaster rescue or emergency response has long been a major focus of wireless network design. For example, many projects are focused on deploying wireless sensor networks to be utilized in search-and-rescue after disasters. Body area networks (BANs) are difficult to utilize during disaster rescue due to limited transmission range and power supply of body sensors.

BRIEF SUMMARY OF IMPLEMENTATIONS

Body area networks (BANs) implemented in accordance with this disclosure may enter a disaster rescue mode. Various disaster-related triggers may cause a BAN to enter a disaster rescue mode. Devices operating in disaster rescue mode perform various operations to assist in rescue.

In some implementations, the BAN devices in disaster rescue mode suspend their security protection and connect to any portal device nearby. In disaster rescue mode, body sensors or the hub can broadcast distress signals. These broadcasts may be received by portal devices, such as rescue devices, or may be relayed or delivered by neighboring BANs. The distress signals may contain personal profile information as well as location information. When instant delivery is unachievable, the disaster rescue mode BAN system intermittently broadcasts the messages while reducing unnecessary power consumption.

In some implementations, various trigger conditions may be used to enter the disaster rescue mode. The BAN devices may transmit disaster alerts to nearby BANs. A manual trigger mechanism may be provided on some or all of the BAN devices (such as a hub's user interface (UI)). Sensors or other BAN devices may trigger the disaster rescue mode based on detected events. Additionally, a trigger may be provided by a connected server.

Rescue devices search both the hub-server's frequency band and the BAN's frequency band. After acquiring the distress signals, rescue devices export body sensors' data with or without the help from the hubs. Potentially, a hub can act as a rescue device when properly manufactured and configured.

After building the connection with the rescue team, the remaining BAN system may transit from disaster rescue mode to normal mode, thereby saving power and enhancing security. An interim mode may be provided to help monitor the patients' status more intensively than in the normal mode. In the interim mode, the BAN systems continue their security protection after connecting to the rescue devices.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various implementations, is described in detail with reference to the following figures. The drawings are provided for purposes of illustration only and merely depict typical or example implementations of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 2 illustrates an environment having a plurality of BANs in a disaster situation.

The figures are not exhaustive and do not limit the invention to the precise form disclosed. It should be understood that the invention can be practiced with modification and alteration, and that the disclosed technology be limited only by the claims and the equivalents thereof.

DETAILED DESCRIPTION

Figure 1:
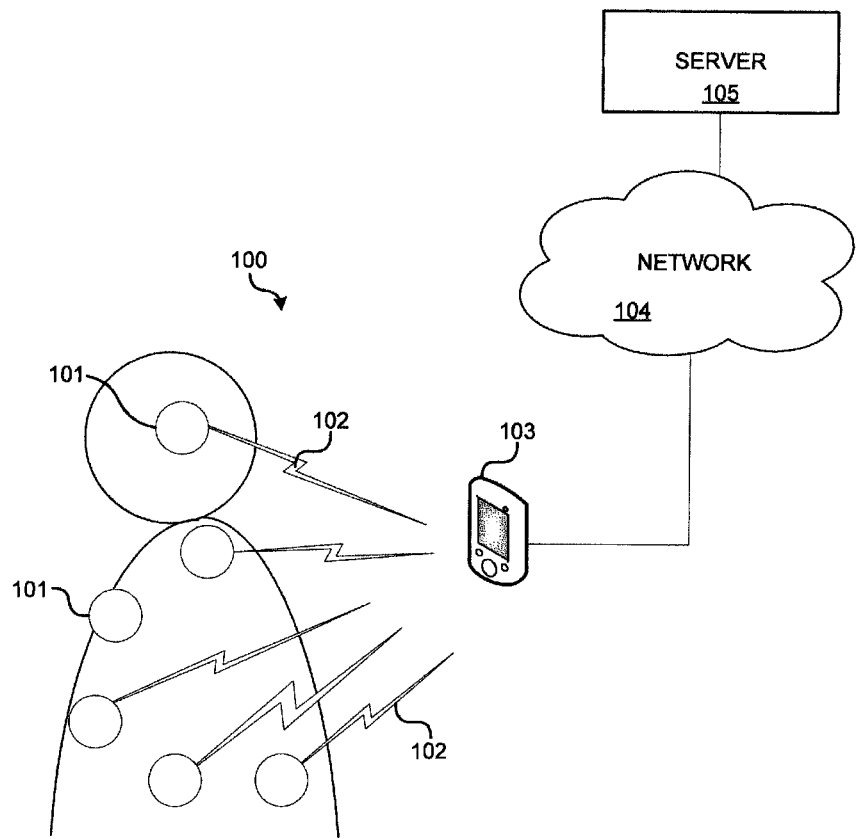
FIG. 1 illustrates an example body area network (BAN) that may be configured to implement various aspects of the disaster rescue mode operation described herein.

FIG. 1 illustrates an example body area network (BAN) that may implement various disaster operations. The BAN 100 comprises wearable or implantable BAN sensors or actuators (BAN devices) 101 exchanging data 102 with external devices 105 via a hub 103. Applications for BANs 100 can range from entertainment to medical and wellness. Particularly, in medical-related applications, BAN devices 101 can help people to measure the critical body indicators, such as heart rate, blood pressure, electromyogram readings, acceleration, body or limb position, or other readings.

Usually, each BAN 100 comprises one hub 103 (often combined/collocated with a smart phone) and various numbers of body sensors/actuators ("BAN devices") 101. The BAN devices 101 connect to the hub 103 in a star topology. During normal operations, the hub 103 controls the networks. To convey the body data to external servers 105 in hospitals, BAN devices 101 are required to communicate 102 with the hub 103 first. The hub 103 then delivers the information to the hospital servers 105 via networks 104 other than BAN 100 technologies. For example, network 104 may comprise the Internet and the hub 103 may connect to the server 105 using a virtual private network (VPN).

In general, BANs 100 are usually seen as a special type of wireless networks with a set of dedicated functionalities. They are also seen as one type of application of "Internet of Things," or "Cyber Physical System." Due to the power-limited nature of BANs 100, the short transmission range, and strong security protection, BANs 100 may have limited networking capabilities compared to wireless ad hoc networks (WANETs). For example, during normal operations, in some embodiments BAN devices 101 cannot connect to other devices outside their own BAN 100. As another example, relaying does not typically occur in BANs 100. Therefore, in a disaster, for example, earthquake, flooding, tornado, blizzard, hurricane, etc., if the hub 103 loses its connection to the server 105, the corresponding BAN 100 will totally lose its functionalities. However, under these circumstances, individual BAN devices 101 are usually properly functioning.

FIG. 2 illustrates an environment having a plurality of BANs in a disaster situation. In this example, three BANs 204, 208, 206 are close enough to have overlapping ranges.

In a disaster situation, some or all of the network hubs of BANs 204, 208, 206 may be damaged or missing. For example, in FIG. 2, BANs 204 and 206 do not have hubs. In some implementations, the devices can be configured such that if a hub is missing for a predetermined period of time, a disaster operations mode is triggered. For example, if the hub from a BAN 204, 206 remains missing for a sufficient time period, the devices 207, 210 of BANs 204, 206 can trigger a disaster operations mode. In the normal operational mode, BANs 204 and 206 would not communicate with a hub 209 in a peer BAN (e.g., BAN 208). However, in the disaster operations mode, the BAN devices 207, 210 may attempt to communication with hub 209 or devices 211 of BAN 208 to allow the hub 209 to serve as an information relay.

Additionally, in some implementations, rescue device 205 may have hub functionality. Such rescue devices 205 may be devices carried by rescue personnel, or devices otherwise placed in the environment. In some embodiments, devices 207, 210 may connect to rescue devices 205. These rescue devices 205 may connect to servers such as the normal hospital server 201 or an emergency server 202. Additionally, the rescue devices 205 may collect information from BANs 204, 206, 208 for immediate use, such as rescuing victims. Additionally, in some implementations, certain hubs 209 are configured to act as rescue devices 205 upon entering a disaster rescue mode. Alternatively, instead of connecting directly to rescue device 205, the devices 207, 210 connect to the hub 209, which connects and relays information to the rescue device 205 (for example, using another network protocols, such as an 802.11x or Bluetooth protocol).

If there is a suitable hub device 209 (or in some cases, rescue device 205) nearby, distress signal messages containing personal profile information as well as location information can be relayed or even delivered by the hub device 209 to external systems, such as rescue device 205 (if not serving as a hub) or emergency servers 202. When a neighboring Hub 209 is unavailable to serve as a relay, the BAN system may intermittently broadcast the messages and at the same time reduce unnecessary power consumption, waiting for the messages to be relayed or picked up by the rescue team.

In some cases, even if a BAN 208 keeps a connected 212 hub 209, the hub 209 may lose its connection to the external device 201 (e.g., a hospital server). For example, the hub 209 might lose its connection to the Internet 203 during a disaster. In some implementations, the loss of connectivity (e.g., loss of a server 201 connection) for a sufficient time triggers the BAN 208 to enter into the disaster rescue mode. Additionally, alerts 214, 213 from BANs 204, 206 may also trigger the BAN 208 to enter into the disaster rescue mode.

In some embodiments, BANs 204, 208, or 206 are configured such that when they detect the presence of a rescue device 205 having hub functionality, the BAN systems 204, 206, 208 start a disaster rescue mode by building a connection with the rescue device 205. This may include suspending various security-related operational parameters to allow data to be sent outside the BAN. When the connection is built, the devices 207, 210, 211 of BANs 204, 206, 208 broadcast body data useful for rescue operations, such as physical status, and location information, and personal profile information. While connected to the rescue device 205, the BANs 204, 206, 208, may enter an interim state where disaster alerts are no longer broadcast, but security protection is not restored.

Figure 3A:
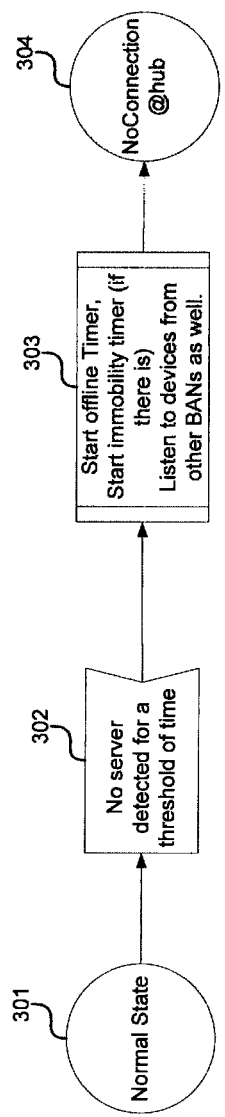
FIGS. 3A and 3B illustrate a method for a BAN having a hub to enter a disaster rescue mode.
Figure 3B:
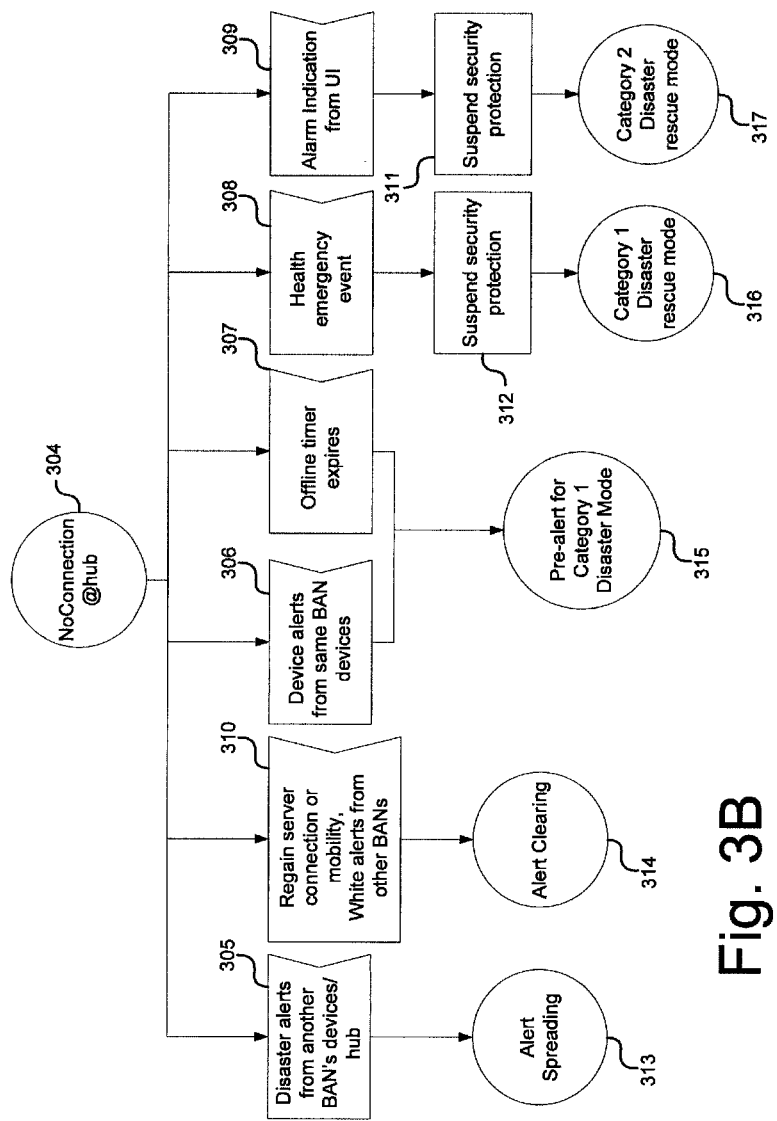
Figure 4A:
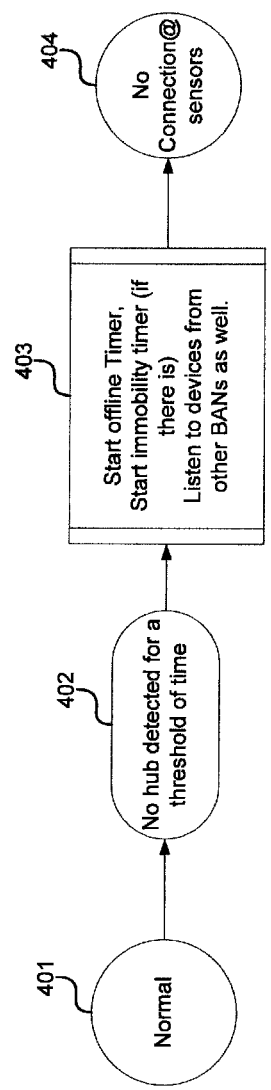
FIGS. 4A and 4B illustrate a method for a BAN that loses its hub to enter a disaster rescue mode.
Figure 4B:
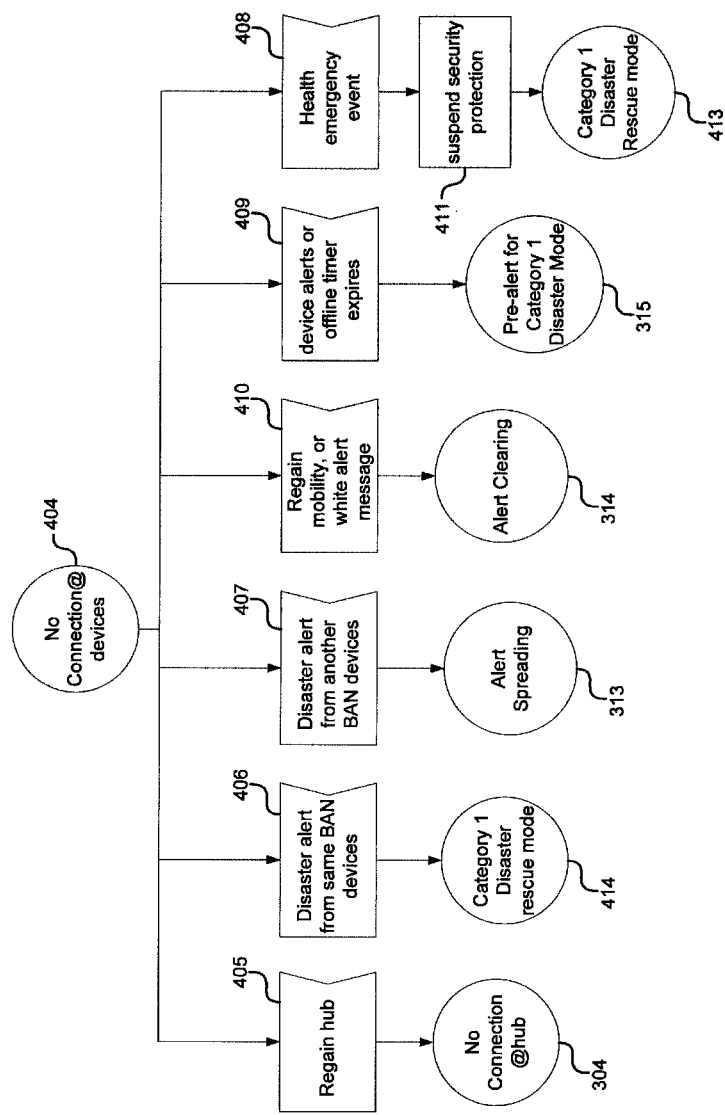

FIGS. 3A and 3B illustrate a method for a BAN with a hub (a hub-present BAN) to enter a disaster rescue mode in accordance with one embodiment of the technology described herein. For example, BAN 208 of FIG. 2, which maintains connections 212 between hub 209 and intra-BAN devices 211, may implement this method. FIGS. 4A and 4B illustrate an example method for a BAN that loses its hub (a hub-absent BAN) to enter a disaster rescue mode. For example, BANs 204 and 206 may implement this method.

Before addressing these figures, example disaster triggering modes are described. In some implementations, multiple categories of disaster rescue mode triggering conditions may occur. In one example implementation, there are four categories of disaster triggering modes. This example is now described.

First, a Category 1 triggering mode can be included to monitor stand-alone triggering events that trigger entry into a disaster rescue mode based on intra-BAN events. For example, offline timers, immobility timers, and emergency events from intra-BAN devices (such as dangerous heart rate, blood pressure, or glucose levels) can serve as Category 1 triggers. As BAN devices may have many different functions, other optional triggering conditions may be allowed. For example, events such as extreme humidity, temperature, and disallowed or dangerous locations (e.g., through a GPS monitor) may serve as triggering conditions.

Second, a Category 2 triggering mode can be provided to allow manual entry into a disaster rescue mode. For example, a user interface (UI) on the BAN hub may allow the user to enter the disaster rescue mode manually. Alternatively, a BAN sensor may have a UI, such as a button, that allows the user to enter the disaster rescue mode manually. Often it is simpler for a human to confirm a disaster, via vision, hearing, and other senses, than for a BAN. Category 2 triggers may be configured to allow a BAN to enter a disaster rescue mode earlier than use of Category 1 triggers or in disaster conditions that would not cause Category 1 triggers.

Third, a Category 3 triggering mode can be included to allow remote triggering to cause entry into a disaster rescue mode. For example, a trusted remote server 105 (FIG. 1), may send a Category 3 trigger alert to the hub 103 to cause the BAN to enter a disaster rescue mode. Such a remote triggering condition may be useful when an impending disaster is known beforehand, such as an impeding severe weather event.

Fourth, a Category 4 trigger mode can be provided to allow neighboring BANs to trigger a BAN to enter a disaster rescue mode. For example, in FIG. 2, BAN 204's loss of a hub may cause it to enter a disaster rescue mode. BAN device 207 may then spread 214 the alert to BAN 208. This can cause a Category 4 trigger in BAN 208. In various implementations, different initial triggers can have different Category 4 spreading behavior.

Turning to FIG. 3A, methods of emergency rescue mode triggering when a server disconnection occurs are illustrated. In some implementations, the hub device performs the illustrated operations. In other implementations, the hub and the other intra-BAN devices perform the illustrated operations. The BAN hub or the BAN hub and BAN devices, depending on the implementation, may perform operations described as performed by "the BAN." In various embodiments, the BAN can be configured to include a normal operational mode 301, in which the hub communicates with intra-BAN devices and communicates with an external server to relay information from and to the intra-BAN devices. During these normal operations 301, the BAN may implements various security protections. For example, the intra-BAN devices will not connect with hubs in nearby peer BANs and will not transfer information to devices other than the BAN hub.

In operation 302, if the hub loses its connection to its server, and does not reestablish the connection within a threshold amount of time, the hub performs operation 303. In some embodiments, the loss of connection may be a total loss of connection, while in other embodiments the loss of connection may be a degradation in the communication link such that only unacceptably low band-width or high error-rate communications are possible.

In operation 303, the hub starts an offline timer and begins listening for transmissions from neighboring BANs. In some implementations, operation 303 may further comprise transmitting the timer information to the BAN devices, or transmitting an instruction to begin timing to the BAN devices. Accordingly, if the hub runs out of power, or is damaged, the BAN devices may continue the method without losing timing information.

After the hub begins operation 303, the hub moves to sub-method 304 (FIG. 3B), which can include one or more operations that occur when there is no server connection at the hub. In particular, in the illustrated example, sub-method 304 comprises detecting various trigger conditions 305-310.

In this example implementation, a first trigger condition 305 comprises detecting a disaster alert transmitted by a neighboring BAN's devices or hub. The disaster rescue mode may comprise broadcasting disaster alerts as PHY/MAC-level messages to other neighboring BANs. If those alerts are received 305, then they trigger the BAN to proceed to an alert spreading sub-method 313 (described below with respect to FIGS. 8A and 8B). Depending on the results of the alert spreading sub-method 313, the BAN may enter a disaster rescue mode. In other words, the first trigger condition 305 and alert spreading sub-method 313 can include evaluating whether to enter a disaster rescue mode based on a Category 4 triggering condition.

A second trigger condition 306 comprises detecting a sensor alert transmitted from a device of the current BAN (i.e., an intra-BAN device). A sensor alert may comprise a sensor event that is less severe than an emergency event, but may be indicative of a problem. For example, the sensor alert may comprise a mobility alert, a detection of an unsafe pulse rate, a detection of an unsafe body temperature or ambient temperature, or detection of a noxious gas. In further implementations, the sensor alert may comprise a timer alert. For example, an accelerometer may begin an immobility timer. As another example, the hub may begin a low heart rate timer if a wearer's heart rate drops below a threshold amount. Here, if the second trigger condition 306 occurs, the BAN enters a pre-alert mode 315 (described below with respect to FIG. 5).

A third trigger condition 307 comprises detecting the expiration of the offline timer started in operation 303. In different implementations, the expiration time for the offline timer may be set based on various considerations. In some implementations, the offline time may be standardized or otherwise set the same for all BANs in an area. In other implementations, the expiration time may be BAN-specific. For example, the BAN for a patient with a sensitive condition that needs frequent monitoring may have an expiration time that is shorter than that of a patient that needs less frequent monitoring. In the illustrated implementation, when the offline timer expires 307, the BAN enters a pre-alert mode 315 (described below with respect to FIG. 5).

A fourth trigger condition 308 is the occurrence of a health emergency event in the BAN. A health emergency event is detected based on a transmission from an intra-BAN device. For example, if an intra-BAN heart monitor detects a heart attack or an intra-BAN EEG detects a stroke, the BAN devices may transmit a health emergency event notification to the hub.

In this implementation, after fourth trigger condition 308, the BAN suspends or partially suspends security protections 312 and then enters a Category 1 disaster rescue mode 316. The step of partially suspending security protections 312 can be included to allow the BAN to transmit information that is normally restricted to rescue devices (e.g., device 205 in FIG. 2) or other neighboring devices (e.g., other peer BAN devices). For example, information such as the BAN wearer's profile, name, age, gender, last known location, and current health condition may be accessible after suspension of security protections 312. In some implementations, the step of suspending security protection 312 may comprise a complete or partial suspension of security protection. For example, any actuators among the intra-BAN BAN devices may still require an authenticated server connection before operating. As another example, BAN devices might only transmit current information, and not allow access to historical information.

In the illustrated example, after the fourth trigger condition 308 occurs and the system suspends security protections 312, the system enters a Category 1 disaster rescue mode 316. In this implementation, the Category 1 disaster rescue mode 316 is non-spreading. In other words, the disaster alerts transmitted to other BANs are indicating as non-spreading. (As discussed with respect to FIGS. 8A and 8B, non-spreading alerts are not retransmitted by receiving BANs). However, the system continues to monitor for other trigger conditions 305-309, and may switch to an alert spreading rescue mode based on other trigger conditions occurring. In the non-spreading Category 1 disaster rescue mode 316, the BAN listens to the channel for alerts from neighboring BAN devices and connection attempts from rescue devices or other devices. Additionally, the BAN searches for devices to connect to, such as peer hubs acting as relay devices, rescue devices, or server connections. In some implementations, the BAN transmits or broadcasts application layer distress signals for receipt by rescue devices or servers (after possible relay by other hub devices). In some cases, the distress signals may include information that would be subject to the BAN's security protections if not suspended in step 312. Additionally, during Category 1 disaster rescue mode 316, the hub coordinates and schedules when distress signals are transmitted by the BAN to save power and increase survival chance.

The fifth trigger condition 309 in this example comprises a manual disaster rescue mode trigger. For example, the trigger 309 may comprise a manual alarm indication entered in the hub device's UI. After obtaining the trigger condition 309, the BAN suspends security protection 311 and enters a Category 2 disaster rescue mode 317. In some implementations, the same security protections are suspending in step 311 as in step 312. In other implementations, the step of suspending security protections 311 may provide greater or lesser access to information as the step of suspending security protections 312. The BAN operations in the Category 2 disaster rescue mode 317 may be similar to the operations performed in the Category 1 disaster rescue mode 316. As discussed below, during the disaster rescue mode, disaster alerts may be transmitted to neighboring BAN devices. The disaster alerts are transmissions to neighboring BAN devices to cause a Category 4 triggering condition. In various cases, the disaster alerts may be spreading alerts, which are rebroadcast by receiving devices, or non-spreading alerts, which are not rebroadcast by receiving devices.

While monitoring for triggering conditions 305-309, the BAN may also be configured to monitor for conditions 310 that cause the BAN to re-enter normal operations. Examples of such alert-clearing conditions 310 include regaining a server connection, receiving a white alert from another BAN, and clearing a previous health alert (for example, if a BAN device running an immobility timer regains mobility or if a BAN device reporting a dangerous heart rate detects a return to a normal heart rate). If an alert-clearing condition 310 occurs, the method proceeds to the alert clearing sub-method 314 (described below with respect to FIG. 8).

As described above, in some cases, a BAN may be missing a hub during a disaster. FIGS. 4A and 4B illustrate a method for BAN missing a hub to enter a disaster rescue mode. In some implementations, each BAN device performs each of the method steps. Similar to operation 301 of FIG. 3A, the BAN devices can be configured to operate in a normal operational mode. As described with respect to FIG. 1, during the normal operational mode, the BAN devices 101 connect to a hub 103 that directs network operations and enables communication with an external trusted server 105.

In operation 402, if the BAN device loses its connection to the hub, and does not reestablish the connection within a threshold amount of time, the device performs operation 403. In operation 403, the device starts a connectionless timer and begins listening for transmissions from neighboring BANs.

After the device begins operation 403, the BAN device moves to sub-method 404, comprising operations that occur when there is no connection at the BAN device. In particular, sub-method 404 can include detecting various conditions 405-410, including triggering conditions 406-409. In some implementations, the BAN device begins timing other conditions at the start of sub-method 404. For example, an accelerometer may be able to detect if a wearer is immobile (and hence in potential danger). As another example, a heart rate monitor may begin a low heart rate timer if a wearer's pulse drops below a threshold amount.

Under condition 405, if the device regains a connection to the hub, the hub will take over and perform the sub-method 304.

Under condition 406, if the device detects a disaster alert (i.e., a MAC or network level disaster alert) transmitted by a device in the same BAN, the device enters a Category 1 disaster rescue mode 414. This Category 1 disaster rescue mode 414 may be a non-spreading disaster rescue mode (see step 316 of FIG. 3B). Various security procedures may be implemented to prevent malicious transmission of disaster alerts within a BAN. For example, security keys or other authorization information exchanged during normal operations 301 may be used to verify intra-BAN disaster alert transmissions.

In this implementation, the device that receives the disaster alert 406 does not suspend security protections. However, the device in the BAN that originated the disaster alert received as condition 406 (i.e., the device in the BAN that experienced a condition 408 or 409) would suspend security protections (at step 411 or as part of sub-method 416, respectively). Accordingly, the distress signal transmitted by the BAN device receiving 406 the alert may include the relevant details provided by the device that originated the alert (including details provided because of the alert-transmitting device's suspension of security protection).

Under condition 407, if the BAN device receives a disaster alert transmitted by another BAN's devices (or, in some cases, another BAN's hub), the BAN device proceeds to the alert spreading sub-method 313 (described below with respect to FIGS. 8A and 8B).

Under condition 408, if the BAN device senses a health emergency event it suspends security protection 411 and enters a Category 1 disaster rescue mode 413. For example, if the BAN device is a heart monitor. Detecting a health emergency event 408 might comprise, for example, detecting a heart attack. The suspension of security protections 411 may comprise partial or full suspension of security protections, as described above with respect to operations 311 and 312 of FIG. 3B.

Under condition 409, if the BAN device detects a sensor alert or expiration of a timer, the BAN device enters the pre-alert sub-method 315. In some cases, the step of detecting a sensor alert may be performed by detecting a sensor alert directly. For example, if the BAN device is a thermometer, the sensor alert might be detecting an unsafe temperature. In other cases, the step of detecting a sensor alert may be performed by detecting a sensor alert transmitted by another intra-BAN device. The detection of timer expiration may be similar to condition 307. For example, the expiration of the offline timer, immobility timer, or other timer started after step 403 may meet trigger condition 409.

While monitoring for triggering conditions 405-409, the BAN device also monitors for conditions 410 that cause the BAN device to re-enter normal operations. Examples of such alert-clearing conditions 410 receiving a white alert from another BAN or another intra-BAN device, and clearing a previous health alert (for example, if a BAN device running an immobility timer regains mobility or if a BAN device reporting a dangerous heart rate detects a return to a normal heart rate). If an alert-clearing condition 410 occurs, the method proceeds to the alert clearing sub-method 314 (described below with respect to FIG. 9).

Figure 5:
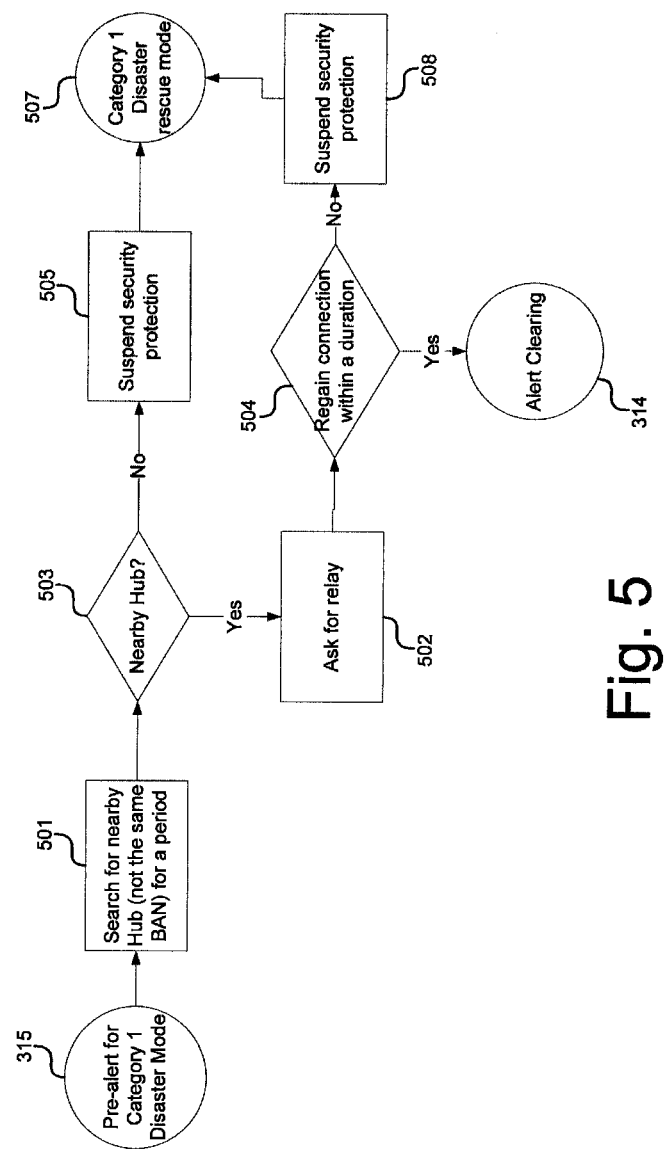
FIG. 5 illustrates an example pre-alert sub-method that may be implemented as part of the methods illustrated with respect to FIGS. 3A and 3B or FIGS. 4A and 4B.

FIG. 5 illustrates an example pre-alert sub-method 315 in accordance with one embodiment of the technology described herein. The sub-method 315 begins by searching for neighboring hub devices for a search period. In some implementations, the search period may be different for different devices. For example, the search period may be shorter for BAN devices performing the method than for hub devices. In other implementations, the search period is the same for all devices. In still further implementations, the search period may be divided between the BAN devices or BAN hub and devices. If the hub device is active, this division may be controlled by the hub device. If the hub device is not active, then the division may be coordinated by the BAN devices.

If a neighboring hub was detected 501, then the neighboring hub device is asked to a relay connection 502. The relay connection allows the neighboring hub device to relay distress signals to rescue devices or emergency servers. For example, in FIG. 2, device 210 could form a relay connection with hub 209 to relay distress signals to rescue device 205.

If the device regains a connection 504 within a period of time (for example, if a hub performing sub-method 315 regains a server connection or if a BAN device performing sub-method 315 regains a hub connection), then the device proceeds to the alert clearing sub-method 314. If the device does regain a connection 504, then the device proceeds to the alert-clearing sub-method 314. If the device does not regain the connection 504, then the device suspends, or partially suspends security protections 508 and proceeds to a Category 1 disaster rescue mode 507.

Returning to detection operation 503, if a nearby hub is not detected 503, the device suspends (or partially suspends, as discussed above) security protections 505 and enters the Category 1 disaster rescue mode 507.

Figure 6:
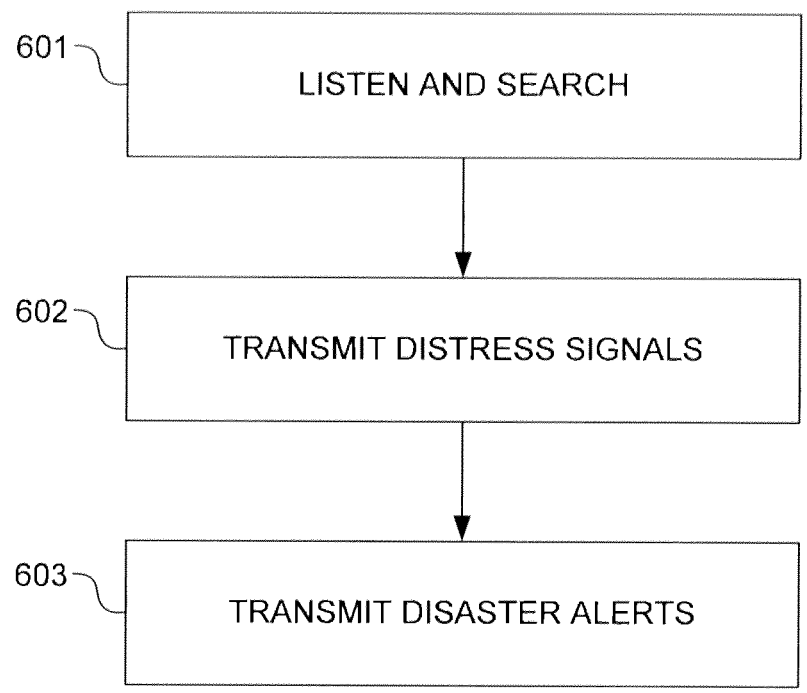
FIG. 6 illustrates the operations of a device during a disaster rescue mode.

FIG. 6 illustrates the operations of a device (i.e., a hub or a BAN device) during a disaster rescue mode in accordance with one embodiment of the technology described herein. The first operation 601 can include listening to available channels and searching for possible relay or rescue devices. In some modes (e.g., Category 3 trigger modes where the BAN system is online and the server triggers the disaster rescue mode), the BAN system can skip operation 601 until the server connection is lost. The overhearing and searching task 601 for BAN systems attempts to recover a connection with the hospital server (e.g., 105 or 201) or some alternative server (e.g., 202). When the connection is rebuilt, body data along with location information can be timely reported to assist in rescue.

If a direct connection is not available, operation 601 can further include the BAN system attempting to find other wireless devices that may have a longer transmission range for relay. For BAN systems with an operational hub, the hub may overhear the channels in the BAN frequency band(s) and frequency bands used for the connection with the hospital server (usually Bluetooth, WiFi, or cellular frequency bands). When the hub is absent, each individual BAN device monitors the BAN frequency for potential replacement hubs, rescue devices, or relay hubs. Any available wireless device, including nearby hubs, relay devices deployed as public facilities, or other wireless devices having longer transmission range may be helpful for relaying the distress signals.

Additionally, in hub-absent BAN systems, operation 601 can include monitoring broadcast messages from other intra-BAN devices. This monitoring collects each BAN device's status and ensures that the current alert status is up-to-date. For example, if a hub-absent BAN system enters a disaster rescue mode due to the expiration of immobility timer 409, it should clear the alert 314 as soon as some sensors detect the mobility again.

In some implementations, during disaster rescue mode, the BAN systems lengthen their waking time beyond their normal operational waking time to perform operation 601.

Listening to the channel also assists in coordinating message sending to save power. This is described in further detail with respect to FIG. 7.

In order to spread the disaster alerts, operation 601 further comprises monitoring neighboring BANs' messages. This is described in further detail with respect to FIGS. 8A and 8B.

During step 602, the BAN system transmits distress signals. In some implementations, whether or not the BAN system finds a relay device or not, it continuously send out distress signals for potential rescue until the disaster rescue mode is clear.

Distress signals can be application layer information encapsulated in various message formats. In some embodiments, the distress signal is short while providing sufficient information to assist in rescue. In some implementations, the distress signal contains the BAN ID, name, gender, age, rough health status, hospital server address, and location information. The data rate of the distress signal may be selected to enhance the probability of potential reception.

For hub-absent scenarios, the BAN devices within the same BAN coordinate sending distress signals as well as disaster alerts via their BAN interfaces. The coordination mechanism is described with respect to FIG. 7. When a hub is in place, it transmits distress signals via the uplink interface, usually Bluetooth, WiFi or cellular. To prevent malicious sabotage of a running system by using fraud distress signals, various security protocols may be used in the distress signals.

In operation 603, the BAN system transmits disaster alerts. Disaster alerts can be BAN network-level messages that are used for Category 4 triggering. This is explained in further detail with respect to FIGS. 8A and 8B. In some implementations, distress signals can be contained in disaster alerts— for example, if the hub is absent during the disaster rescue mode.

When the hub is present, the BAN can rely on the hub to send out distress signals via uplink interface and disaster alerts in the BAN interface. In these cases, BAN devices do not need to specifically send out disaster alerts. Instead, they can include the disaster alert information in their regular messages to the hub. In some cases, when the BAN system enters disaster rescue mode, the hub instructs the BAN devices to follow a more power-saving communication schedule.

Figure 7:
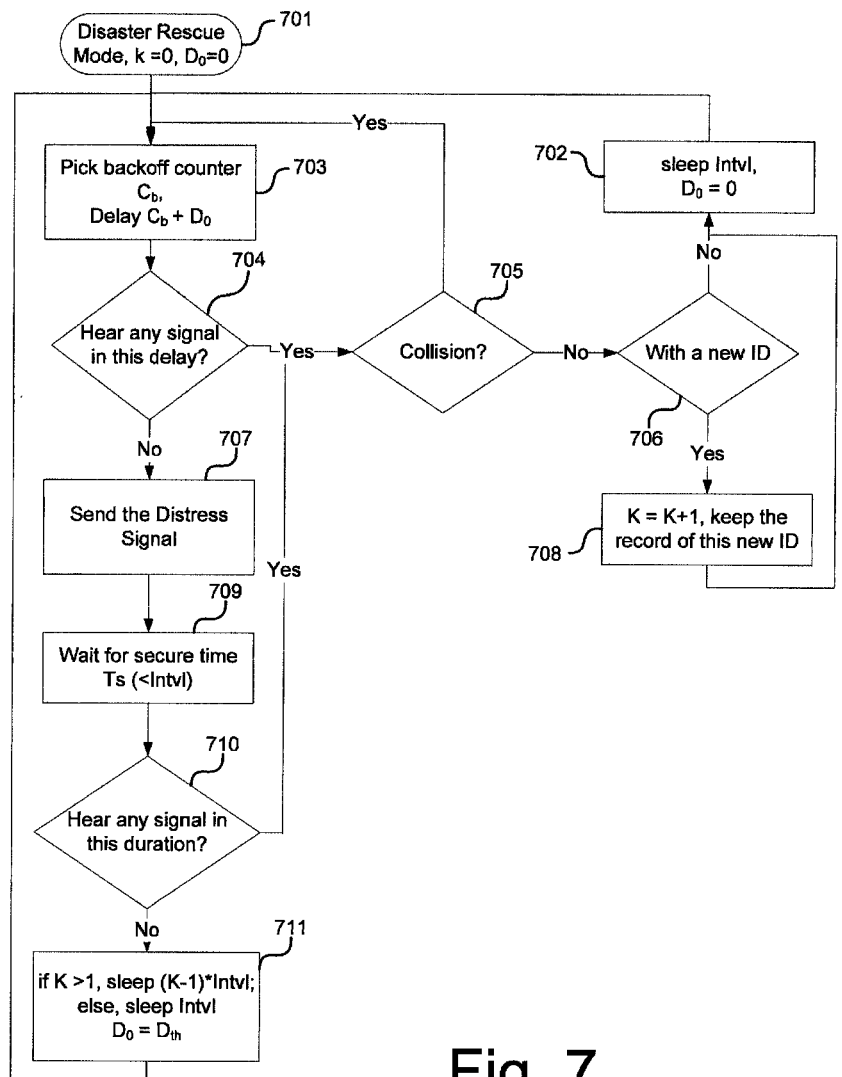
FIG. 7 illustrates a method of BAN devices to coordinate transmission and monitoring duties.

When a hub is absent in disaster rescue mode, multiple BAN devices coordinate to transmit distress signals and disaster alerts. Additionally, the BAN devices do not go to sleep whenever the data transmission is finished. Instead, they stay awake longer to wait for external and internal BAN messages. FIG. 7 illustrates a method of BAN devices to coordinate transmission and monitoring duties in accordance with one embodiment of the technology described herein. In this method, the participating BAN devices coordinate to send distress signals with a constant interval, Intvl, between transmissions. The participating BAN device that is scheduled to transmit a distress signal in the current Intvl is termed the active BAN device. Additionally, each participating BAN device wakes up one Intvl before its turn as the active BAN device to serve as a backup BAN device.

When the disaster rescue mode begins 701, the active BAN device sets a device counter K to 0, and a delay parameter $D_0$ to 0. $D_0$ is a set delay before a backoff counter $C_b$ begins counting.

In operation 703, the active BAN device picks a random value for backoff counter $C_b$ and delays for a period of time $C_b+D_0$. In some implementations, $C_b$ is a random value in the interval $[0, D_{th}]$ (i.e., the interval from 0 to $D_{th}$ but not including $D_{th}$). While delaying for $C_b+D_0$, the active device (and, in some cases, the backup device) monitor the channel for a signal 704.

If the active BAN device detects a signal 704, and the signal was a collision 705 between transmissions by other BAN devices, then the device repeats from step 703.

If the signal was not a collision 705, then the active BAN device decodes the transmission to determine the device ID of the transmitter. If the device ID is new 706, then the active BAN device detected a new participating BAN device. The active BAN device updates K by adding 1 and maintains a record of the new device's ID 708. The active BAN device then sleeps for an Intvl and sets $D_0=0$ 702. The active BAN device then repeats from operation 703. If the device ID 706 is not new (i.e., it was added to its record of device IDs in a previous step 708), then the active BAN device performs operation 702.

Returning to operation 704, if the active BAN device does not hear any signal during the delay $C_b+D_0$, then the active BAN device broadcasts the distress signal 707. If the active BAN device does not send the distress signal, then the backup device sends the distress signal some number of timeslots later. Additionally, the backup device monitors the channel while the active BAN device broadcasts the distress signal 707. If the backup device determines that the active BAN device's broadcast failed (e.g., due to a collision), the backup device may broadcast the distress signal 707 after the colliding transmission ends.

The active BAN device then waits and listens to the channel for a secure time $T_s$ 709 (where, $T_s$<Intvl). Waiting for $T_s$ allows the active device to determine if the distress signal broadcast failed. Additionally, the active device may determine if the backup device broadcast a distress signal, and if so, if the backup device's broadcast failed.

If the active BAN device detects a signal during $T_s$ 710, then the active BAN device moves to step 705. If the active BAN device detects a signal during $T_s$ 710, then the active BAN device sets $D_0=D_{th}$ to act as the backup device the next time it wakes (if K≥1) and sleeps 711. The length of time the active BAN device sleeps is based on the number of participating devices. If K>1, then the device sleeps for (K−1)*Intvl, otherwise, the device sleeps for Intvl (to act as the backup device next if K=1, or to repeat acting as the active device if K=0).

Figure 8A:
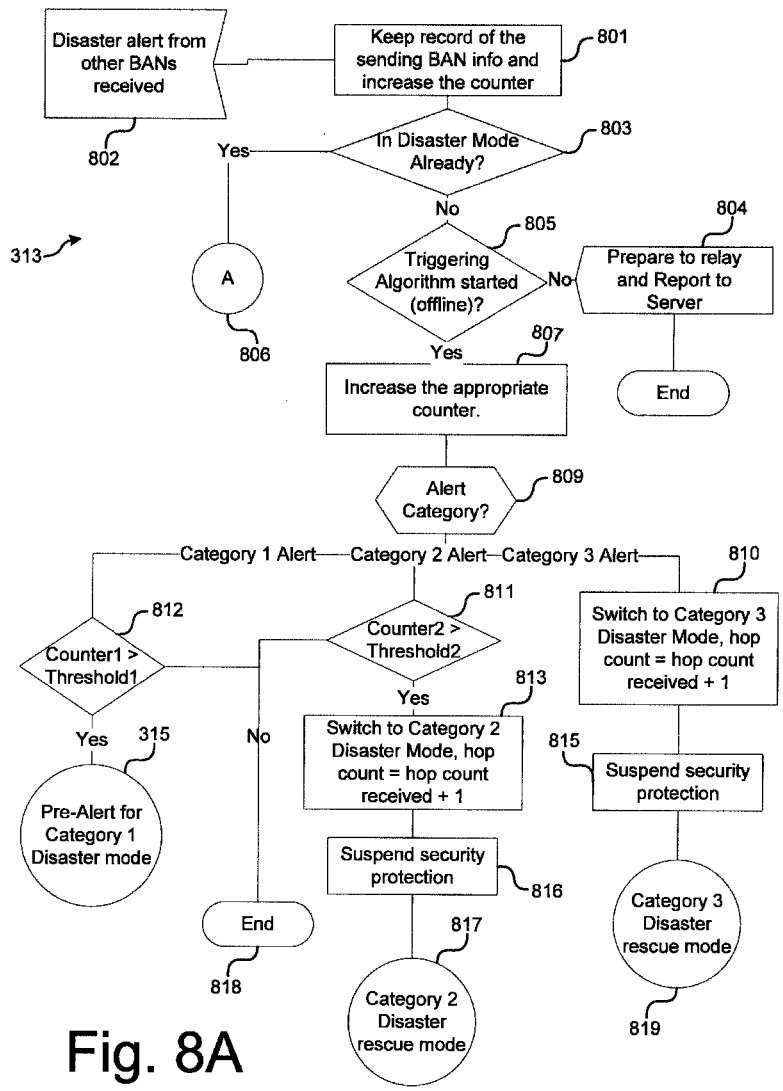
FIGS. 8A and 8B illustrate an alert spreading sub-method that may be implemented as part of the methods illustrated with respect to FIGS. 3A and 3B or FIGS. 4A and 4B.
Figure 8B:
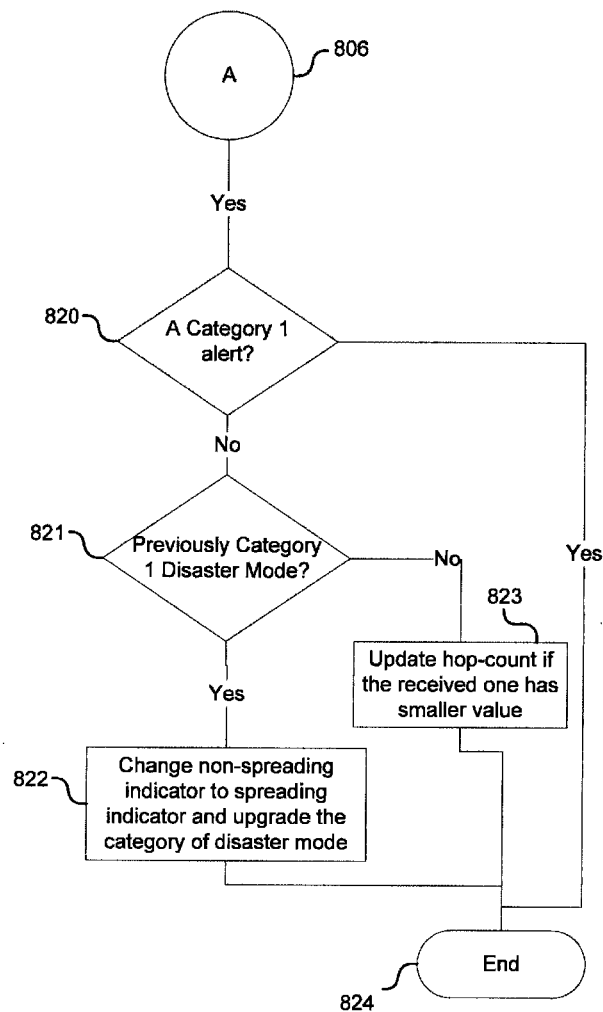

FIGS. 8A and 8B illustrate an alert spreading sub-method 313 for Category 4 disaster rescue mode triggering in accordance with one embodiment of the technology described herein. As discussed above, both hub-present BANs and hub-absent BANs may perform this sub-method.

In operation 802, the device (i.e, hub or BAN device) receives an alert from another BAN. To begin, the device keeps a record of the alert and the sending BAN. As discussed above, different disaster alerts indicate whether the alert should be spread. When a BAN device or the hub hears an alert 802, it keeps a record 801 of the spreading indicator of the received alert. Besides the spreading indicator, each alert record 801 may include the sending BAN ID, category of the disaster rescue mode, hop count if it is a spreading alert, alert's originating BAN ID (re-transmitted alerts have different sending and originating BAN IDs), and time stamp. Time stamp and source BAN ID are used to prevent recursive spreading. In some implementations, disaster alerts transmitted by other BANs have an information element that signals normally operating hubs to receive and decode the message. The information element prevents the normal operational state of ignoring messages from neighboring bans. Additionally, the disaster alerts may include security mechanisms, such as digital signatures. In particular, a Category 3 disaster alert may include a digital signature provided by the originating server. The devices may validate this digital signature according to information received during normal operations.

Additionally, in some implementations, a hop-count is kept and increased each time a spreading disaster alert (e.g, Category 2 and 3 disaster alerts) is retransmitted for each disaster alert. Disaster alerts may expire after a certain number of disaster alerts. In some embodiments of these implementations, only unexpired disaster alerts cause the device to begin operation 801.

If the receiving device is already in disaster rescue mode 803, then the device proceeds to sub-method A 806 (see, FIG. 8B). If the receiving device is not already in disaster rescue mode 803, then if the device is a hub device, the hub determines if a triggering algorithm has occurred 805 (in other words, if the alert is received by a hub that has exited the normal state 301 in FIG. 3A). If not, then the hub prepares to act as a relay for the transmitting BAN and reports to the server 804. If necessary, the server 804 may then issue a white alert (as described with respect to FIG. 9). If the device is a BAN device, the BAN device will only begin step 801 if the device has left the normal state 401. Accordingly, condition 805 will always occur for BAN devices performing the method.

In this example sub-method, devices do not enter some categories of disaster rescue mode unless a sufficient number of corresponding disaster alerts are received. This mitigates the risk of malicious or error-based propagation of disaster rescue mode entry.

In some embodiments, the device maintains different counters for different disaster rescue mode categories. For example, the device may maintain a counter, counter1, for disaster alerts from BANs in the Category 1 disaster rescue mode and a counter, counter2, for disaster alerts from BANs in the Category 2 disaster rescue mode. In this example, receipt of a valid Category 3 disaster rescue mode alert always causes the device to enter a Category 3 disaster rescue mode. In operation 807, the device increases the appropriate counter based on the category of alert received. For example, if the device receives a Category 1 disaster alert, the device increases counter1 by one. Additionally, in some implementations, Category 2 disaster alerts are weighted according to their hop count such that Category 2 disaster alerts with higher hop counts are weighted less strongly than Category 2 disaster alerts with lower hop counts. As an example, a first hop might have a weight of 3, a second hop might have a weight of 2, and a third hop might have a weight of 1 (in this example, Category 2 disaster alerts would not be retransmitted after the third hop). In these implementations, counter2 is increased by the weight of the received Category 2 disaster alert.

The alert category 809 determines the next step.

If the received alert is a Category 3 disaster alert, at operation 810 the device switches to a Category 3 disaster rescue mode, and increases the hop count of the received Category 3 disaster alert. The switch to the Category 3 disaster rescue mode comprises suspending (or partially suspending) security protocols 815 and commencing operation in the Category 3 disaster rescue mode 819. In some implementations, if the received Category 3 disaster rescue mode alert is not expired after increasing its hop count, mode 819 comprises rebroadcasting the Category 3 disaster rescue mode alert.

If received alert is a Category 2 disaster alert, then the device determines 811 whether counter2 is greater than a threshold, threshold2. If counter2>threshold2 811, then the device switches to the Category 2 disaster rescue mode 813 and increases hop count of the received disaster alert. The switch to the Category 2 disaster rescue mode comprises suspending (or partially suspending) security protocols 816 and operating in the Category 2 disaster rescue mode 817. In some implementations, if the received Category 2 disaster rescue mode alert is not expired after increasing its hop count, mode 817 comprises rebroadcasting the Category 2 disaster rescue mode alert.

If the received alert is a Category 1 alert, then the device determines 812 whether counter1 is greater than a threshold, threshold1. If counter1>threshold1, then the device performs the pre-alert method 315 described with respect to FIG. 5.

Returning to condition 803, if the device is in a disaster rescue mode, the device proceeds to sub-method 806. Referring now to FIG. 8B, if the received alert is a Category 1 alert 820, the alert is ignored 824. If the received alert is not a Category 1 alert 820, then the next step depends on whether the device is in a Category 1 disaster rescue mode 821. If the device is in a Category 1 disaster rescue mode 821, then the device upgrades to the category disaster rescue mode indicated by the received alert 822. Additionally, the device changes its transmitted disaster alerts to indicate that they should be spreading alerts. If the device is not in a Category 1 disaster rescue mode 821, then the devices updates increases the hop count if the received alert had a smaller hopcount than the device's alert's current hop count and continues the current disaster rescue mode operations.

In further implementations, if the device is in a Category 2 disaster rescue mode, and receives a Category 3 disaster alert, then the device may upgrade to a Category 3 disaster rescue mode. In such a case, the device would also update the hopcount if the received disaster alert has a smaller value than its current disaster alert.

Figure 9:
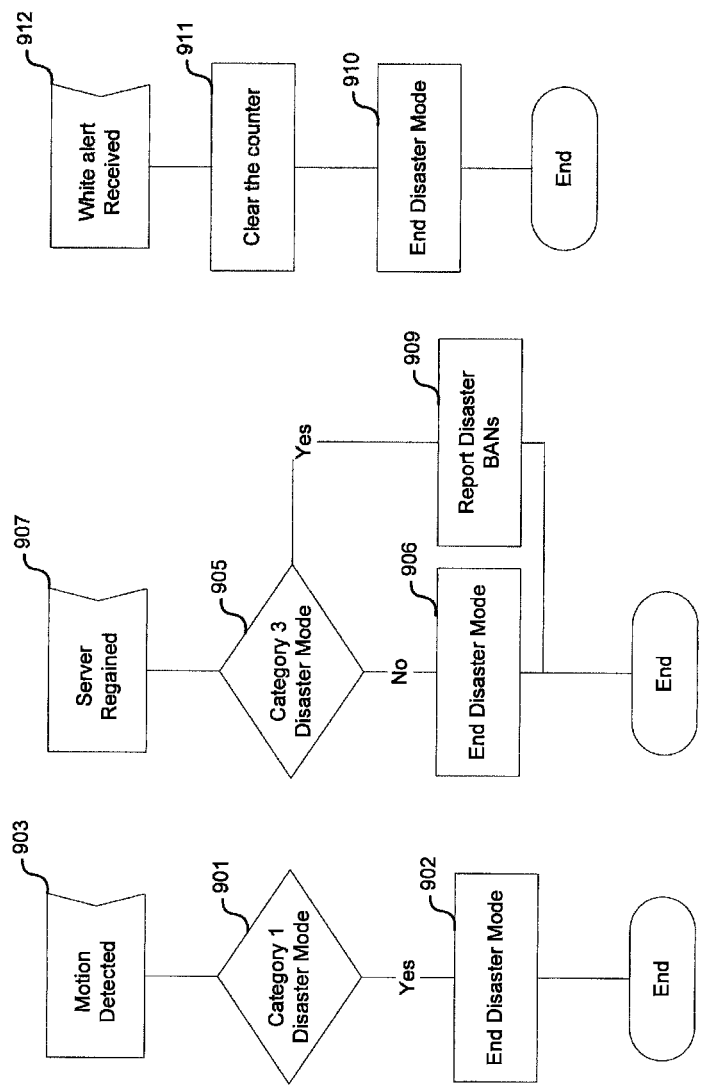
FIG. 9 illustrates example alert-clearing methods that may be implemented as part of the methods illustrated with respect to FIGS. 3A and 3B or FIGS. 4A and 4B.

FIG. 9 illustrates methods for exiting disaster rescue modes in accordance with various embodiments of the technology described herein.

If a condition 903 that caused entry into a Category 1 disaster rescue mode 901 (such as an immobility timer) no longer exists, then the device will exit the Category 1 disaster rescue mode 902. In some implementations, the step of exiting the Category 1 disaster rescue mode 902 further comprises transmitting a white alert to neighboring BANs.

If the BAN is operating a hub-present disaster rescue mode, then regaining a server connection 907 may cause the BAN to exit the disaster rescue mode. If the BAN is in a Category 3 disaster rescue mode 905, then the BAN hub relays distress signals from the neighboring BANs 909. If the BAN is not in a Category 3 disaster rescue mode 905, then the BAN exits the disaster rescue mode 906. In some implementations, the step of exiting the disaster rescue mode 906 further comprises transmitting a white alert to neighboring BANs.

Third, if a white alert is received 912, then the BAN clears the current counter 911 and ends the disaster rescue mode 910. In some implementations, the step of exiting the disaster rescue mode 910 further comprises transmitting a white alert to neighboring BANs.

Figure 10:
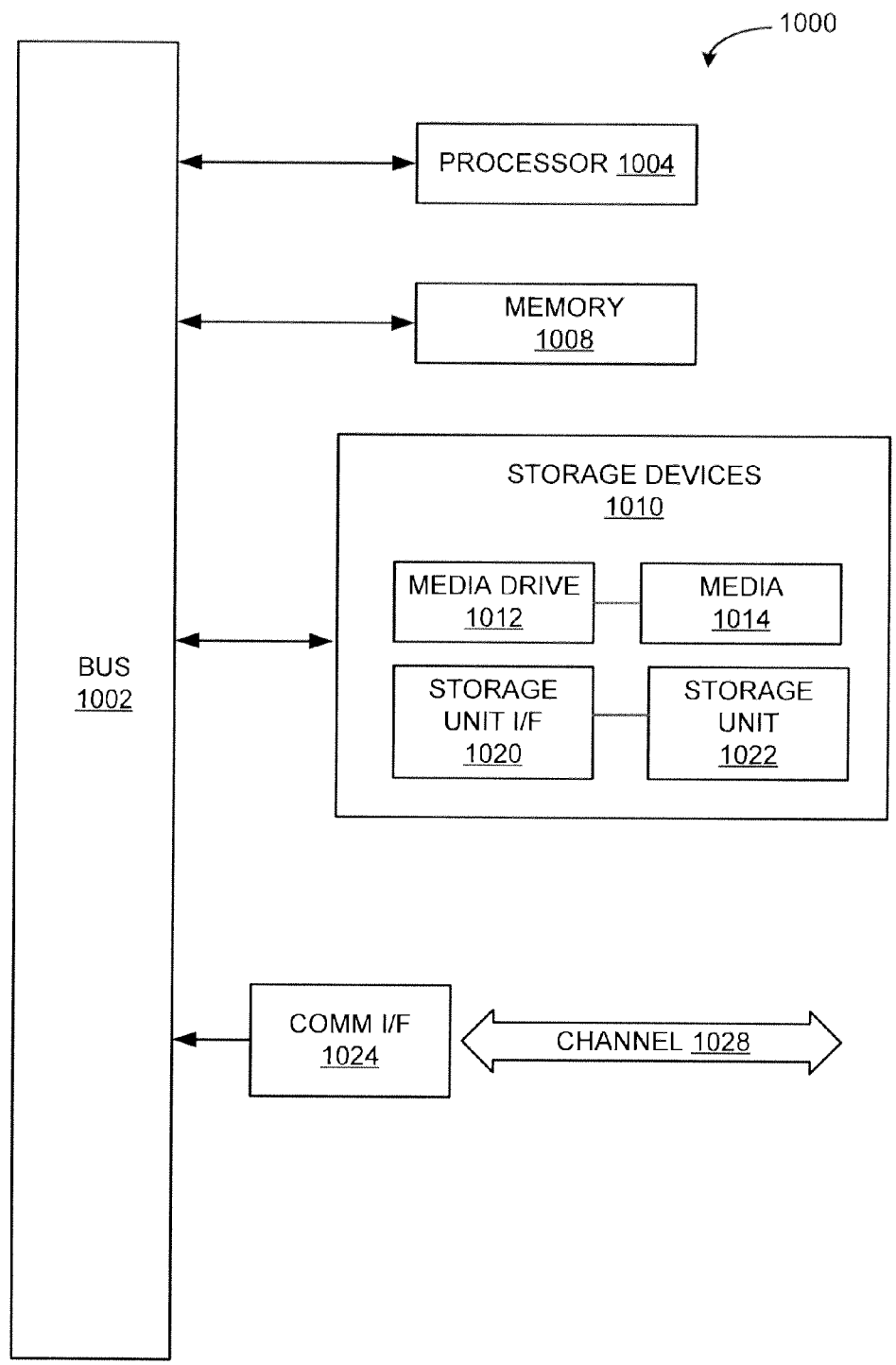
FIG. 10 illustrates an example computing module that may be used in implementing various features of implementations of the disclosed technology.

As used herein, the term module might describe a given unit of functionality that can be performed in accordance with one or more implementations of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one implementation, these software elements can be implemented to operate with a computing or processing module capable of carrying out the functionality described with respect thereto. One such example computing module is shown in FIG. 10. Various implementations are described in terms of this example-computing module 1000. After reading this description, it will become apparent to a person skilled in the relevant art how to implement the technology using other computing modules or architectures.

Referring now to FIG. 10, computing module 1000 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1002 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a floppy disk drive, a magnetic tape drive, an optical disk drive, a CD or DVD drive (R or RW), or other removable or fixed media drive might be provided. Accordingly, storage media 1014 might include, for example, a hard disk, a floppy disk, magnetic tape, cartridge, optical disk, a CD or DVD, or other fixed or removable medium that is read by, written to or accessed by media drive 1012. As these examples illustrate, the storage media 1014 can include a computer usable storage medium having stored therein computer software or data.

In alternative implementations, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the disclosed technology as discussed herein.

While various implementations of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various implementations be implemented to perform the recited functionality in the same order unless the context dictates otherwise.

Although the disclosed technology is described above in terms of various exemplary implementations and implementations, it should be understood that the various features, aspects and functionality described in one or more of the individual implementations are not limited in their applicability to the particular implementation with which they are described, but instead can be applied, alone or in various combinations, to one or more of the other implementations of the disclosed technology, whether or not such implementations are described and whether or not such features are presented as being a part of a described implementation. Thus, the breadth and scope of the technology disclosed herein should not be limited by any of the above-described exemplary implementations.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various implementations set forth herein are described in terms of exemplary block diagrams, flow charts and other illustrations. As will become apparent to one of ordinary skill in the art after reading this document, the illustrated implementations and their various alternatives can be implemented without confinement to the illustrated examples. For example, block diagrams and their accompanying description should not be construed as mandating a particular architecture or configuration.

The invention claimed is:

1. A method of entering a disaster rescue mode in a body area network, comprising:
    operating as a connected device in the body area network in a normal operational mode;
    detecting a disaster rescue mode trigger; and
    operating in the body area network in the disaster rescue mode;
    wherein the disaster rescue mode comprises the device suspending part or all of its security protection and connecting to an available portal within range of the device.

2. The method of claim 1, further comprising transmitting a disaster rescue mode alert while in the disaster rescue mode.

3. The method of claim 1, wherein, in the normal operational mode, a hub device of the body area network is connected to a server via a connection to an external network, and the step of detecting the disaster rescue mode trigger comprises receiving an instruction to enter the disaster rescue mode from the server.

4. The method of claim 1, wherein, in the normal operational mode, the connected device is connected to a hub device, and the step of detecting the disaster rescue mode trigger occurs only if the connection to the hub device is lost and not regained for a threshold disconnect time.

5. The method of claim 1, wherein, in the normal operational mode, a hub device of the body area network is connected to a server via a connection to an external network, and the step of detecting a disaster rescue mode trigger occurs only if the connection to the server is lost and not regained for a threshold disconnect time.

6. The method of claim 1, wherein the step of detecting the disaster rescue mode trigger comprises receiving a manually prompted trigger.

7. The method of claim 1, wherein the step of detecting the disaster rescue mode trigger comprises receiving an indication of an emergency condition from a device connected to the body area network or detecting the expiration of an offline timer.

8. The method of claim 7, wherein the indication of the emergency condition comprises a sensor alert from a body sensor connected to the body area network.

9. The method of claim 7, further comprising:
searching for a peer hub device of a peer body area network; and
if the peer hub device is discovered, connecting to the peer hub device to relay messages.

10. A method of entering a disaster rescue mode in a body area network, comprising:
operating as a connected device in the body area network in a normal operational mode;
detecting a disaster rescue mode trigger, wherein the step of detecting the disaster rescue mode trigger comprises receiving an indication of an emergency condition from a device connected to the body area network or detecting the expiration of an offline timer;
operating in the body area network in the disaster rescue mode;
searching for a peer hub device of a peer body area network;
if the peer hub device is discovered, connecting to the peer hub device to relay messages; and
if the peer hub device is not discovered, suspending a security protection protocol.

11. The method of claim 1, wherein the step of detecting the disaster rescue mode trigger comprises receiving a disaster alert from another device of the body area network.

12. The method of claim 1, wherein the step of detecting the disaster rescue mode trigger comprises receiving a disaster alert from a device of a peer body area network.

13. A method of entering a disaster rescue mode in a body area network, comprising:
operating as a connected device in the body area network in a normal operational mode;
detecting a disaster rescue mode trigger, wherein the step of detecting the disaster rescue mode trigger comprises receiving a disaster alert from a device of a peer body area network;
operating in the body area network in the disaster rescue mode;
determining an alert category of the disaster alert from the device of the peer body area network;
increasing a disaster alert counter for the alert category; and,
if the disaster alert counter exceeds a threshold for the alert category, entering the disaster rescue mode, wherein the disaster rescue mode corresponds to the alert category.

14. The method of claim 13, further comprising broadcasting a version of the disaster alert, the version of the disaster alert comprising a hop count greater than a received hop count of the received disaster alert.

15. A method of entering a disaster rescue mode in a body area network, comprising:
operating as a connected device in the body area network in a normal operational mode;
detecting a disaster rescue mode trigger, wherein the step of detecting the disaster rescue mode trigger comprises receiving a disaster alert from a device of a peer body area network;
operating in the body area network in the disaster rescue mode;
determining an alert category of the disaster alert from the device of the peer body area network; and
entering the disaster rescue mode, wherein the disaster rescue mode corresponds to the alert category.

16. The method of claim 1, wherein the step of detecting the disaster rescue mode trigger comprises receiving more than a threshold number of disaster alerts from devices of peer body area networks.

17. The method of claim 1, wherein the disaster rescue mode is one of a plurality of disaster rescue modes.

18. The method of claim 1, wherein the disaster rescue mode comprises the device broadcasting a distress signal.

19. The method of claim 18, wherein, in the disaster rescue mode, the device coordinates with at least one other device of the body area network to broadcast distress signals at a distress signal broadcast frequency.

20. A method of entering a disaster rescue mode in a body area network, comprising:
operating as a connected device in the body area network in a normal operational mode;
detecting a disaster rescue mode trigger;
operating in the body area network in the disaster rescue mode, wherein the disaster rescue mode comprises the device broadcasting a distress signal, and wherein in the disaster rescue mode, the device coordinates with at least one other device of the body area network to broadcast distress signals at a distress signal broadcast frequency; and
in the disaster rescue mode, during a first distress signal transmission period, the device acting as an active transmitting device, and during a second distress signal transmission period, the device acting as a back-up transmitting device.

21. The method of claim 20, wherein, during the first signal transmission period, the device listens to a channel for a backoff time, and, if no signal is heard during the backoff time, the device transmits the distress signal.

22. The method of claim 20, wherein, during the second signal transmission period, the device listens to a channel for a backup backoff time greater than an active backoff time, and if no signal is heard during the backup backoff time, the device transmits the distress signal.

23. The method of claim 18, wherein the disaster rescue mode comprises the device searching for a hub outside the body area network.

24. The method of claim 23, further comprising the device connecting to the hub outside the body area network and using the hub outside the body area network to relay distress signals.

25. The method of claim 18, wherein the disaster rescue mode comprises the device searching for a portal device outside the body area network.

26. The method of claim 25, wherein the disaster rescue mode comprises the device connecting to a server via the portal device.

27. The method of claim 18, wherein the distress signal comprises at least one of personal profile information and location information.

28. The method of claim 1, further comprising, while operating in the disaster rescue mode, broadcasting a non-spreading disaster alert.

29. The method of claim 28, further comprising, while operating in the disaster rescue mode:
  receiving a spreading disaster alert; and
  after receiving the spreading disaster alert, broadcasting a version of the received spreading disaster alert.

30. The method of claim 1, further comprising, while operating in the disaster rescue mode, broadcasting a spreading disaster alert having a hop count.

31. A method of entering a disaster rescue mode in a body area network, comprising:
  operating as a connected device in the body area network in a normal operational mode;
  detecting a disaster rescue mode trigger;
  operating in the body area network in the disaster rescue mode;
  while operating in the disaster rescue mode:
    broadcasting a spreading disaster alert having a hop count;
    receiving a second spreading disaster alert having a second hop count; and
    after receiving the spreading disaster alert, updating the first hop count of the first spreading disaster alert to equal the second hop count if the second hop count is less than the first hop count.

32. The method of claim 1, further comprising, while operating in the disaster rescue mode, obtaining a disaster rescue mode clearing trigger; and resuming operating in the normal operations mode.

33. The method of claim 32, wherein the disaster rescue mode clearing trigger comprises detection of an rescue mode clearing event, regaining a server connection, or receiving a white alert.

34. A hub device for a body area network programmed to perform a method of entering a disaster rescue mode in the body area network, the method comprising:
  operating as the hub device in the body area network in a normal operational mode;
  detecting a disaster rescue mode trigger; and
  operating in the body area network in the disaster rescue mode;
  wherein the disaster rescue mode comprises the hub device suspending part or all of its security protection and connecting to an available portal within range of the hub device.

35. The hub device of claim 34, wherein the method further comprises transmitting a disaster rescue mode alert while in the disaster rescue mode.

36. The hub device of claim 34, wherein, in the normal operational mode, the hub device of the body area network is connected to a server via a connection to an external network, and the step of detecting the disaster rescue mode trigger comprises receiving an instruction to enter the disaster rescue mode from the server.

37. The hub device of claim 34, wherein, in the normal operational mode, the hub device of the body area network is connected to a server via a connection to an external network, and the step of detecting the disaster rescue mode trigger occurs only if the connection to the server is lost and not regained for a threshold disconnect time.

38. The hub device of claim 34, wherein the hub device comprises a user interface and the step of detecting the disaster rescue mode trigger comprises receiving a manually prompted trigger entered in the user interface.

39. The hub device of claim 34, wherein the step of detecting the disaster rescue mode trigger comprises receiving an indication of an emergency condition from a device connected to the body area network or detecting the expiration of an offline timer.

40. The hub device of claim 39, wherein the method further comprises:
  searching for a peer hub device of a peer body area network; and
  if the peer hub device is discovered, connecting to the peer hub device to relay messages.

41. A hub device for a body area network programmed to perform a method of entering a disaster rescue mode in the body area network, the method comprising:
  operating as the hub device in the body area network in a normal operational mode;
  detecting a disaster rescue mode trigger, wherein the step of detecting the disaster rescue mode trigger comprises receiving an indication of an emergency condition from a device connected to the body area network or detecting the expiration of an offline timer;
  operating in the body area network in the disaster rescue mode;
  searching for a peer hub device of a peer body area network;
  if the peer hub device is discovered, connecting to the peer hub device to relay messages; and
  if the peer hub device is not discovered, suspending a security protection protocol.

42. The hub device of claim 34, wherein the step of detecting the disaster rescue mode trigger comprises receiving a disaster alert from a device of a peer body area network.

43. The hub device of claim 34, wherein the step of detecting the disaster rescue mode trigger comprises receiving more than a threshold number of disaster alerts from devices of peer body area networks.

44. The hub device of claim 34, wherein the disaster rescue mode is one of a plurality of disaster rescue modes.

45. A body area network device programmed to perform a method of entering a disaster rescue mode in a body area network, the method comprising:
  operating as a network device connected to a hub device in the body area network in a normal operational mode;
  detecting a disaster rescue mode trigger; and
  operating in the body area network in the disaster rescue mode;
  wherein the disaster rescue mode comprises the network device suspending part or all of its security protection and connecting to an available portal within range of the network device.

46. The body area network device of claim 45, wherein the method further comprises transmitting a disaster rescue mode alert while in the disaster rescue mode.

47. The body area network device of claim 45, wherein, in the normal operational mode, the hub device of the body area network is connected to a server via a connection to an external network, and the step of detecting the disaster rescue mode trigger comprises receiving an instruction to enter the disaster rescue mode from the server.

48. The body area network device of claim 45, wherein the step of detecting a disaster rescue mode trigger occurs only if the connection to the hub device is lost and not regained for a threshold disconnect time.

49. The body area network device of claim 45, wherein the step of detecting the disaster rescue mode trigger comprises receiving an indication of an emergency condition from a device connected to the body area network or detecting the expiration of an offline timer.

50. The body area network device of claim 49, wherein the method further comprises:
   searching for a peer hub device of a peer body area network; and
   if the peer hub device is discovered, connecting to the peer hub device to relay messages.

51. A body area network device programmed to perform a method of entering a disaster rescue mode in a body area network, the method comprising:
   operating as a network device connected to a hub device in the body area network in a normal operational mode;
   detecting a disaster rescue mode trigger, wherein the step of detecting the disaster rescue mode trigger comprises receiving an indication of an emergency condition from a device connected to the body area network or detecting the expiration of an offline timer;
   operating in the body area network in the disaster rescue mode;
   searching for a peer hub device of a peer body area network;
   if the peer hub device is discovered, connecting to the peer hub device to relay messages; and
   if the peer hub device is not discovered, suspending a security protection protocol.

52. The body area network device of claim 45, wherein the step of detecting the disaster rescue mode trigger comprises receiving a disaster alert from a device of a peer body area network.

53. The body area network device of claim 45, wherein the step of detecting the disaster rescue mode trigger comprises receiving more than a threshold number of disaster alerts from devices of peer body area networks.

54. The body area network device of claim 45, wherein the disaster rescue mode is one of a plurality of disaster rescue modes.

* * * * *